DATA BIT TRANSMISSION SYSTEM WITH MEANS TO ADJUST LINE EQUALIZER IN RESPONSE TO DISPLAY ON MONITORING OSCILLOSCOPE

Filed Jan. 2, 1962

INVENTORS.
WINFREE P. TUCK
NEIL L. WISEMAN
BY Daniel D. Sharp
ATTORNEY 3,213,196

DATA BIT TRANSMISSION SYSTEM WITH MEANS TO ADJUST LINE EQUALIZER IN RESPONSE TO DISPLAY ON MONITORING OSCILLOSCOPE

Winfree P. Tuck and Neil L. Wiseman, Rochester, N.Y., assignors to General Dynamics Corporation, Rochester, N.Y., a corporation of Delaware Filed Jan. 2, 1962, Ser. No. 163,558
6 Claims. (Cl. 178—69)

Figures 1, 2, 3:
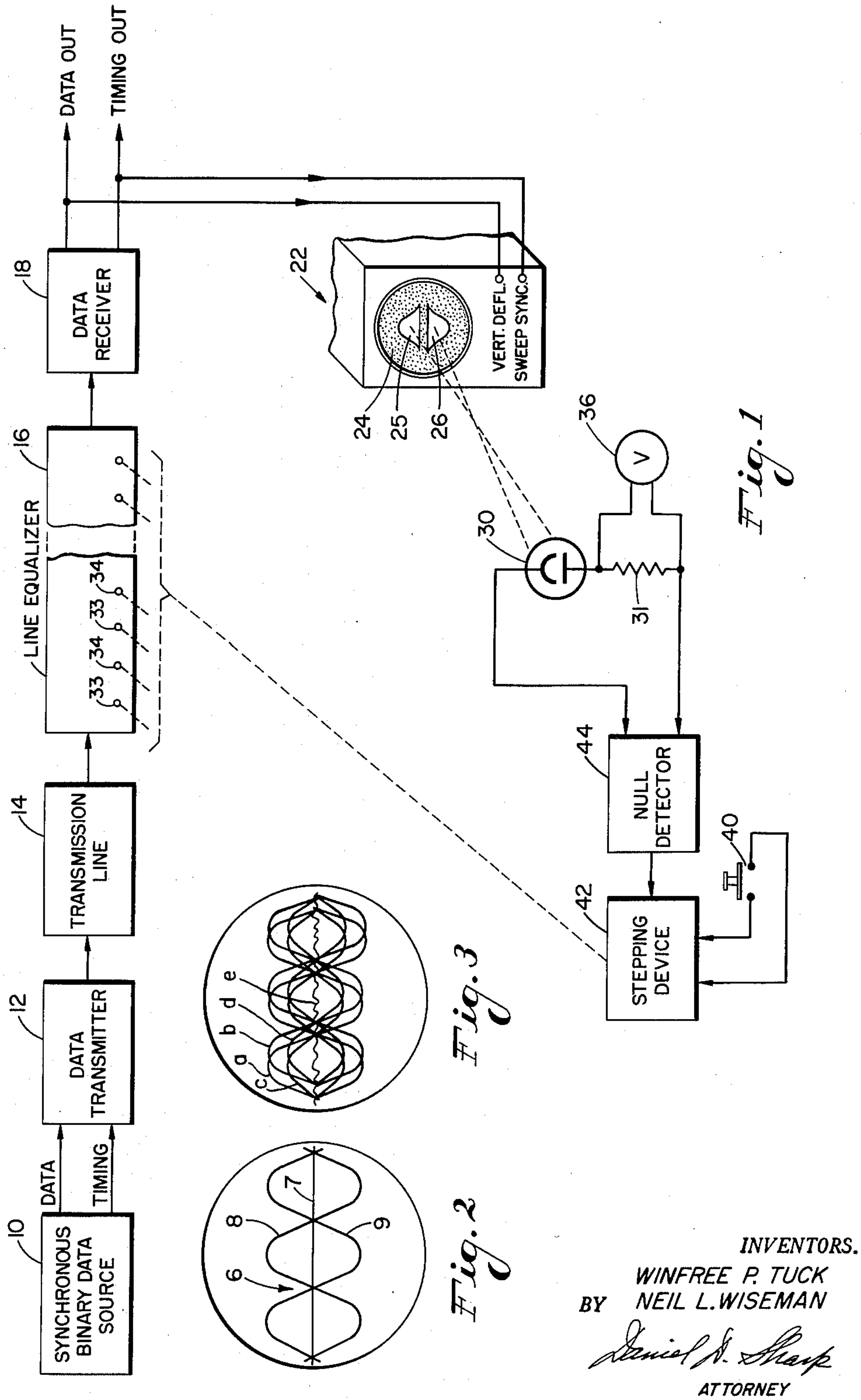

This invention relates to electro-optical means for determining the presence of distortion in a continuous periodic waveform and, more particularly, relates to electro-optical means for providing optimum equalization of a transmission medium used to transmit synchronous binary data.

The transmission of synchronous data, whether in binary or polar form, from a transmitting terminal to a receiving terminal is often accomplished by standard telephone line facilities. Such facilities, although satisfactory for voice communication, may easily introduce sufficient phase and amplitude distortion to data in binary or polar form—with its higher frequency components—to seriously affect reception of the data; indeed, loss of a significant number of information bits may occur under such circumstances. A suitable equalizer may be used to compensate for the phase and amplitude distortion presented by the line over the portion of the frequency spectrum occupied by the data; such equalization techniques are well known in the art.

Previously, the received data has been examined by the naked eye with a conventional cathode-ray oscilloscope and the equalizer adjusted manually until the presentation on the oscilloscope appeared to undergo minimum distortion. This procedure usually is quite time consuming and rather inaccurate, since the naked eye is not a good judge of the relative distortion of the received data as manifested by the configuration of the oscilloscope presentation. In many cases, it is impossible to obtain an adjustment of the equalizer by this prior method which does not retain a certain degree of distortion.

In accordance with the invention, the data signal is displayed on a cathode-ray oscilloscope and the oscilloscope time base sweep is synchronized by means of the data timing signal to prevent random motion of the display on the oscilloscope face. The general pattern of the data modulation, in the absence of distortion, can be determined by viewing the signal at the transmission terminal and prior to modulation of the carrier signal, in cases where modulation is employed. A mask of material opaque to visible radiation is prepared which has an aperture whose periphery generally is of about the same configuration as the envelope of the data. The mask then is positioned over the face of the oscilloscope and aligned with the presentation on the scope. If the displayed data signal, as well as the mask aperture configuration, is a true reproduction of the original distortion-free data signal, the mask will completely cover the displayed luminous trace and will mask it from view. Consequently, the signal cannot be viewed through the mask unless there is a deviation of the signal characteristics, which results in a received signal different from the ideal distortion-free signal. Distortion present within the signal, usually due to phase and amplitude changes introduced by the transmission facilities, will produce this effect. This implies that the light conductance from the oscilloscope face through the mask is proportional to the fidelity of the oscilloscope display. Hence, when distortion is present in the displayed signal, the configuration of the display will deviate from the configuration of the original signal as represented by the contours of the aperture or apertures in the mask. The degree of distortion present determines the degree of deviation of the displayed signal and, consequently, the amount of light passing through the aperture or apertures in the mask. Therefore, the light conductance from the oscilloscope face through the mask opening is proportional to the amount of distortion present in the signal.

Since it is practically impossible to achieve perfect equalization, the trace will jitter slightly and will overshoot and undershoot the mask aperture. This rigid jittering action cannot be detected with the naked eye since the eye tends to integrate the constantly changing pattern. Furthermore, one cannot successfully monitor the entire oscilloscope trace with the unaided eye, but must concentrate on but a small part of the jittery trace. For this reason, it is not possible to determine when optimum equalization has been obtained by attempting to adjust the equalizer until the trace appears to be in alignment with the periphery of the aperture. In accordance with the invention, therefore, the light output from the cathode-ray oscilloscope is directed onto a photoelectric cell and the output from the photoelectric cell may be supplied to an electric indicating meter. By adjusting the various equalizer controls until a null is observed on the meter, precise compensation for distortion of the transmitted data by the transmission facility is possible. The photoelectric cell is quite sensitive to changes in total light flux emanating from the luminous display on the face of the oscilloscope and will respond to small changes in the rapidly changing trace which would not be visible to the naked eye. Even though the indicating meter is damped sufficiently to prevent the needle from excessive oscillations, the accuracy of detection of the photoelectric cell is many times that of the unaided eye.

Although manual adjustment of the equalizer by this method is fast and accurate, it is sometimes advisable to control the equalizer automatically in response to the output from the photocell. In this event, the output from the photocell device is supplied to a null detector which generates an output pulse only when the input signal has passed through a minimum. In the absence of an output pulse from the null detector, electromechanical stepping devices may be arranged, upon initial energization, to provide sequential operation over separate frequency sections of any well known type of equalizer, such as that shown in United States Patent 2,966,633 of W. D. Cannon, entitled "Delay and Amplitude Corrective System," issued December 27, 1960. The first sequence of operation controls in stepwise fashion both parameters of each frequency section of the equalizer separately until phase equalization of the corresponding section has been optimized. The stepping switches then are arranged to permit but one parameter of each of the frequency sections of the equalizer to be varied in turn in stepwise fashion until optimum equalization for amplitude has been obtained.

Although the invention has been described so far as allowing one to adjust a transmission medium until distortion of a signal passing therethrough has been minimized, this invention also involves the simpler expedient of indicating the presence of distortion in any periodic or repetitive input signal applied to the aforesaid optical means and for permitting minimization of this distortion by appropriate means. Other and further advantages of this invention will become apparent as the description thereof progresses, reference being had to the accompanying drawing wherein:

FIG. 1 is a block diagram of a system embodying the invention which illustrates the principles of the operation of the invention;

FIG. 2 is a view showing a typical display which may appear on the face of the oscilloscope shown in FIG. 1 when substantially all distortion of the data being transmitted over the transmission line of FIG. 1 has been compensated for by the line equalizer of FIG. 1; and FIG. 3 is a view showing a typical presentation which may appear on the face of the cathode-ray oscilloscope of FIG. 1 when both amplitude and phase distortion of typical binary data from a synchronous data source occurs.

Referring to FIG. 1, a source of data is indicated by the reference numeral 10. Although the invention need not be limited to any particular form of data, the system will be described as handling synchronous random binary data. The data in the usual form may consist of a serial train of binary impulses representing any one of many combinations of ones or zeros. Normally, the combination of ones and zeros occurring within a pre-established time period will vary for each time period; in this sense, the data is random. Each one is represented by a pulse and each zero by no-pulse. Simultaneously with the production of the binary input data, a clock generator in the input equipment to the system provides regularly recurring pulses which occur at the same rate as the bit rate of the input data. The clock pulses thus are synchronized with each one or zero, as the case may be.

The shaped binary signal of reduced bandwidth at the output of a filter included within the data receiver 18 appears almost sinusoidal when viewed on a cathode-ray oscilloscope, as shown by the display 6 of FIG. 2 where the zeros appear as a horizontal trace 7. In order to eliminate the problem of frequency translation of the transmitted data often inherent when commercial telephone facilities are used, the shaped binary signal may modulate a subcarrier in the data transmitter 12. It should be understood, however, that it may be feasible, in some instances, to transmit the binary signal directly instead of resorting to amplitude modulation of the signal. It should be noted that, inasmuch as the bit rate of the binary information is definite and is synchronized with a timing input, the character of the signal being transmitted over the transmission medium 14 actually is determined in part by the timing input. In other words, the clock information may be thought of as being indirectly transmitted to the receiving terminal at the other end of the transmission medium. It is equally possible to transmit the timing signal directly.

An equalizer 16 is connected in tandem with the transmission medium 14 in accordance with well-known telephone communication practice.

The receiving terminal at the other end of the telephone line facility 14 is connected to the equalizer 16 and includes a receiver 18 for recovering the binary information from the received data signal.

The data from the data receiver 18 is supplied to the vertical sweep circuit terminals of the cathode-ray oscilloscope 22. In order to prevent drift of the displayed data pattern across the face of the oscilloscope, timing signals from the demodulator are supplied to the synchronization terminals of the oscilloscope to synchronize the horizontal sweep of the oscilloscope with the period of the data to be observed or a multiple of said data. In the example illustrated in FIG. 1, the horizontal sweep rate is three times that of the data period. The luminous pattern appearing on the oscilloscope screen will depend upon the phase and amplitude distortion contributed by the telephone line facility 14.

When a one appears in the input pulse train, the cathode-ray tube trace may be either positive-going or negative-going, depending on the demodulator equipment in the receiver 18, as indicated, respectively, as loops 8 and 9 in FIG. 2. The zeros appear on the cathode-ray oscilloscope presentation as a horizontal trace or base line 7, as shown in FIG. 2.

If the transmission line 14 causes distortion of the data being transmitted, the pattern appearing on the oscilloscope will be as shown, by way of example, in FIG. 3. Here, the waveforms *a*, *b*, *c*, *d* and *e* corresponding to different sequences of three information bits are delaying varying amounts and the amplitude of the various waveforms also may differ. The pattern shown in FIG. 3 represents but one of an infinite number of patterns depending upon the particular phase and amplitude characteristics of the telephone line to be equalized. The multiple traces occur because of the persistence of the phosphor used on the fluorescent screen of the oscilloscope. The pattern on the oscilloscope will depend, of course, on the individual settings of the horizontal and vertical positioning control and the gain controls of the X and Y axis oscilloscope amplifiers. The breadth of the luminous display on the oscilloscope will depend in part upon the position of the focus control, while the intensity control setting will be a factor in the brightness of the trace. These oscilloscope controls, of course, are fixed during adjustment of the equalizer.

A mask 24 is attached to the face of oscilloscope 22, in the manner shown in FIG. 1, containing a pair of apertures or windows 25 and 26 for permitting any light emanating from the luminous display on the oscilloscope screen to be directed onto a photosensitive device, such as a photoelectric cell 30. The configuration of each of the windows is substantially similar to the configuration of the area bounded by the periphery of the corresponding to one of the loops 8 or 9 of the display in FIG. 2 and the base line 7 corresponding to a zero bit or bits. If the mask 24 is cut so as to just cover the base line and the periphery of each loop of the trace, then ideally there should be no light, other than ambient light, emanating from the face of the oscilloscope. The ambient light can be reduced to a negligible level by placing a housing over the oscilloscope screen. In the absence of distortion in the telephone line facility, therefore, there should be no light presented to the photoelectric cell. When either amplitude or phase distortion, or both, exists, however, multiple traces of light appear in the windows of the mask; these multiple traces appear because of the persistence of the phosphor of the oscilloscope screen. The light from these traces impinging upon the photoelectric cell 30 causes an output voltage to be derived across the photoelectric cell load resistor 31. The greater the distortion, the more numerous become the traces which appear in the two windows and the greater is the intensity of light incident upon the photoelectric cell 30. Consequently, the output of the photoelectric cell will be an indication of the distortion present in the signal. When the information to be analyzed is such that the oscilloscope presentation is symmetrical with respect to the base line, it is possible to use a mask having a single aperture instead of two. In this case, only one of the two loops 8 and 9 will be effective in determining the light output. It has been found that suitable equalization of the transmission line 14 may be obtained with the system of he invention even when the configuration of the window in the mask departs substantially from that of the oscilloscope presentation. The mask window area must be large enough, however, to provide sufficient luminous flux for the photoelectric cell.

Equalization of the telephone line 14 may be accomplished manually by adjusting the equalizer controls for each section of the equalizer for minimum output from the photoelectric cell, that is, for minimum voltage indication on the voltmeter 36 connected across the load resistance 31 of photoelectric cell 30. Each section of the equalizer contains control knobs 33 and 34 for adjusting the amplitude and phase response of that section. The control knobs 33 and 34 may be connected to variable resistive elements, as in the equalizer described in the aforementioned Cannon patent. The operator proceeds to adjust both control knobs of the first section of the equalizer simultaneously until a minimum reading is observed on the voltmeter 36. The remaining sections of the equalizer are similarly adjusted for minimum voltmeter reading until each section of the equalizer has been properly adjusted to compensate for phase distortion. The operator then proceeds to adjust one only of control knobs 33 and 34 of the first section of the equalizer. This procedure is continued through the remaining sections of the equalizer until all sections have been properly adjusted for minimum signal amplitude distortion. Because of the accuracy and sensitivity of the photoelectric cells, these adjustments may be made quite rapidly and, once having been made, no further adjustments are required so long as the same transmission medium is retained.

The adjustment of the equalizer may also be accomplished automatically by incorporating well known stepping mechanism 42 which may be initially actuated by a manual start switch 40. The stepping mechanism then will continue to vary simultaneously both control elements of the first section of the equalizer until a pulse is received from a null detector 44 coupled to the load resistor of the photoelectric cell 30. Since this null detector does not, per se, constitute the invention, it need not be described in detail here. A null detector suitable for operation with the system of the invention is illustrated and described in a copending application of Neil L. Wiseman, Serial No. 171,505, filed February 6, 1962, and entitled "Slope Detector." This output from null detector 44 serves to terminate the stepping of both control elements of the first section of the equalizer and causes the phase-determining elements of the next section of the equalizer to be stepped in similar fashion until again an output is obtained from the null detector. This sequence continues until all sections of the equalizer have been stepped to the position corresponding to minimum phase distortion.

When using the null detector above described, an output pulse is provided when the stepping operation for a given frequency section of the equalizer has continued one step past the point of optimum phase correction, whereupon the output from the photoelectric cell will have begun to increase rather than decrease. The stepping devices are so arranged that the equalizer controls are set back one step following the step productive of the null detector output pulse; this retrograde action is necessary since this particular null detector compares the current photoelectric cell output level with the level reached at the preceding step. The next output pulse from the null detector initiates stepping of the amplitude adjusting element of the first section to be stepped to the optimum position. When all of the sections of the equalizer have been stepped to the proper position, for optimum amplitude equalization in response to subsequent output pulses from the null detector, the next ensuing output pulse from the null detector deenergizes the stepping mechanism 42. No further adjustments are required unless a different transmission medium 14 is used.

As has been previously mentioned, the electro-optical system of the invention may be used to indicate the presence of distortion in any signal or train of signals which is periodic in nature. In this case, the signal would be applied directly to the vertical deflection terminal of the oscilloscope and the horizontal sweep circuit adjusted until a stationary pattern is obtained on the face of the oscilloscope. The horizontal sweep circuit may be synchronized from a separate source, as described in connection with the system of FIG. 1. The relationship between the configuration of the mask opening and the envelope of the signal being examined will be in accordance with factors already mentioned in the explanation of the system of FIG. 1. If distortion is present, the photocell will be energized and the output voltage may be observed by an indicating voltmeter. The photocell may be so chosen that the threshold current corresponds to the condition at which distortion just commences. If it should be desirable to reduce the distortion present in the signal to a minimum, a device similar to the line equalizer of FIG. 1 may be inserted between the signal and the oscilloscope and adjusted either manually or automatically in a manner already described.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A system for compensation for distortion in a data transmission line comprising:

(a) data transmission means coupled to the input end of said line for transmitting the bits of said data synchronously over said line, (b) adjustable line equalizer means connected to the output end of said line, (c) data receiving means coupled to the output of said line equalizer means for providing an output signal representing said data and a timing pulse synchronously with the receipt of each bit of said data, (d) oscilloscope means including a cathode ray tube having a fluorescent screen, said screen having a persistence period equal to the total duration of a plurality of successive bits of said data, said oscilloscope means including first sweep means responsive to and synchronized by said timing pulses for providing a repetitive trace on said screen in one direction, said oscilloscope means also including deflection means responsive to said output signal for deflecting said trace in a direction perpendicular to said one direction, and (e) means responsive to the illumination emanating from said screen for indicating required adjustment of said equalizer means.

2. The invention as set forth in claim 1 including a mask disposed over said screen, said mask having an aperture corresponding to at least a portion of the said trace provided on said screen when said data is not distorted.

3. The invention as set forth in claim 1 including means coupled to said adjustable equalizer means and responsive to said illumination of said screen for adjusting said equalizer means to minimize said illumination.

4. The invention as set forth in claim 1, wherein said indicating means includes a photoelectric device exposed to said illumination from said screen.

5. The invention as set forth in claim 4, including null detection means responsive to the output of said photoelectric device, and electromechanical means operated by said null detecting means for adjusting said equalizer means.

6. The invention as set forth in claim 2, wherein said mask includes a pair of apertures symmetrically disposed with respect to each other.

References Cited by the Examiner

UNITED STATES PATENTS

| | | | |
|---|---|---|---|
| 2,528,020 | 10/50 | Sunstein | 315—26 |
| 2,556,242 | 6/51 | Mierlo | 333—18 |
| 2,966,633 | 12/60 | Cannon | 330—20 |

ELI LIEBERMAN, *Primary Examiner.*

HERMAN KARL SAALBACH, *Examiner.*